United States Patent
Martinez Lerin

(10) Patent No.: US 10,810,054 B1
(45) Date of Patent: Oct. 20, 2020

(54) CAPACITY BALANCING FOR DATA STORAGE SYSTEM

(71) Applicant: HITACHI, LTD., Tokyo (JP)

(72) Inventor: Pablo Martinez Lerin, Waltham, MA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/524,226

(22) Filed: Jul. 29, 2019

(51) Int. Cl.
 *G06F 9/50* (2006.01)
 *G06F 3/06* (2006.01)

(52) U.S. Cl.
 CPC .......... *G06F 9/5083* (2013.01); *G06F 3/067* (2013.01); *G06F 3/0617* (2013.01); *G06F 3/0647* (2013.01); *G06F 3/0689* (2013.01)

(58) Field of Classification Search
 None
 See application file for complete search history.

(56) References Cited

U.S. PATENT DOCUMENTS

| | | | |
|---|---|---|---|
| 7,092,977 B2 | 8/2006 | Leung et al. | |
| 7,146,389 B2 | 12/2006 | Ebata et al. | |
| 8,539,197 B1 | 9/2013 | Marshall et al. | |
| 8,554,918 B1 | 10/2013 | Douglis | |
| 9,052,826 B2 | 6/2015 | Quan et al. | |
| 2004/0054656 A1* | 3/2004 | Leung | G06F 16/10 |
| 2011/0010518 A1* | 1/2011 | Kavuri | G06F 16/217 711/165 |
| 2016/0350021 A1* | 12/2016 | Matsushita | G06F 12/04 |
| 2017/0262216 A1* | 9/2017 | Polkovnikov | G06F 3/067 |
| 2018/0210656 A1* | 7/2018 | Sato | G06F 3/061 |
| 2019/0018592 A1* | 1/2019 | Wu | G06F 3/0689 |
| 2019/0132256 A1* | 5/2019 | Wada | G06F 9/5077 |

* cited by examiner

*Primary Examiner* — Edward J Dudek, Jr.
*Assistant Examiner* — Ralph A Verderamo, III
(74) *Attorney, Agent, or Firm* — Mattingly & Malur, PC

(57) ABSTRACT

In some examples, a computing device may determine an estimated available capacity at a future time for respective storage nodes of a plurality of storage nodes. The computing device may compare the estimated available capacity of a first one of the storage nodes at the future time with the estimated available capacity of a second one of the storage nodes at the future time. Based at least in part on determining that a difference between the estimated available capacity of the first storage node and the estimated available capacity of the second storage node exceeds a threshold difference, determining an amount of data to move from the first storage node. The computing device may cause data to be moved from the first storage node to cause the difference between the available capacity of the first storage node and the available capacity of the second storage node to be reduced.

20 Claims, 9 Drawing Sheets

| STORAGE NODE ID | TOTAL CAPACITY | AVAILABLE CAPACITY | ESTIMATED AVAILABLE CAPACITY AFTER 1 DAY | ESTIMATED AVAILABLE CAPACITY AFTER 2 DAYS | ESTIMATED AVAILABLE CAPACITY AFTER 3 DAYS | ESTIMATED AVAILABLE CAPACITY AFTER 4 DAYS | ESTIMATED AVAILABLE CAPACITY AFTER 5 DAYS |
|---|---|---|---|---|---|---|---|
| SC1 | 800 TB | 175 TB (22%) | 160 TB (20%) | 145 TB (18%) | 130 TB (16%) | 115 TB (14%) | 100 TB (12%) |
| SC2 | 900 TB | 460 TB (52%) | 425 TB (47%) | 390 TB (43%) | 355 TB (40%) | 320 TB (36%) | 285 TB (32%) |
| ... | ... | ... | ... | ... | ... | ... | ... |
| DIFFERENCE | N/A | 30% | 27% | 25% | 24% | 22% | 20% |

| INGEST THROUGHPUT |
|---|
| 75 TB/DAY |

| STORAGE NODE ID | ASSIGNED WEIGHT |
|---|---|
| SC1 | 20% |
| SC2 | 47% |
| SC3 | 13% |
| SC4 | 20% |

FIG. 5B

| 402 STORAGE NODE ID | 404 TOTAL CAPACITY | 406 AVAILABLE CAPACITY | 408 ESTIMATED AVAILABLE CAPACITY AFTER 1 DAY | 410 ESTIMATED AVAILABLE CAPACITY AFTER 2 DAYS | 412 ESTIMATED AVAILABLE CAPACITY AFTER 3 DAYS | 414 ESTIMATED AVAILABLE CAPACITY AFTER 4 DAYS | 416 ESTIMATED AVAILABLE CAPACITY AFTER 5 DAYS |
|---|---|---|---|---|---|---|---|
| 418 SC1 | 800 TB | 175 TB (22%) | 165 TB (21%) | 155 TB (20%) | 145 TB (18%) | 135 TB (17%) | 125 TB (16%) |
| 420 SC2 | 900 TB | 460 TB (52%) | 420 TB (47%) | 380 TB (43%) | 340 TB (38%) | 300 TB (33%) | 260 TB (29%) |
| ... | ... | ... | ... | ... | ... | ... | ... |
| 422 DIFFERENCE | N/A | 30% | 26% | 23% | 20% | 16% | 13% |

FIG. 8

CAPACITY BALANCING FOR DATA STORAGE SYSTEM

BACKGROUND

A data storage system may include multiple computing devices and associated storage that may be used to store data for users. As one example, a system may include data storage computing devices referred to as "storage nodes" that may store user data content. Uneven capacity usage across the storage nodes may sometimes occur in data storage systems, such as due to a difference in the total data capacity of the individual storage nodes, due to different ones of the storage nodes being added at different times in the life of the storage system, or due to various other factors. As a result, users might experience system performance that is considerably lower than expected, particularly in the case that one of the storage nodes runs out of available capacity and is not able to accommodate new requests for storing data.

Conventional techniques for overcoming unbalanced available capacity in a storage system may include moving data from nearly full to less full storage nodes. However, the conventional techniques may not be able to respond effectively to changes in data placement policies, which may occur frequently, and which may cause considerable capacity unbalance. Furthermore, the conventional techniques for capacity balancing may result in inefficient use of resources, such as when data movement is performed between storage nodes by using more throughput than is actually necessary for preventing any particular storage node from running out of available capacity.

SUMMARY

In some implementations, a computing device may determine an estimated available capacity at a future time for respective storage nodes of a plurality of storage nodes. The computing device may compare the estimated available capacity of a first one of the storage nodes at the future time with the estimated available capacity of a second one of the storage nodes at the future time. Based at least in part on determining that a difference between the estimated available capacity of the first storage node at the future time and the estimated available capacity of the second storage node at the future time exceeds a threshold difference, determining an amount of data to move from the first storage node. Further, the computing device may cause data to be moved from the first storage node to cause the difference between the available capacity of the first storage node and the available capacity of the second storage node to be reduced.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example capacity usage data structure according to some implementations.

FIG. 5A illustrates an example client ingest data structure according to some implementations.

FIG. 5B illustrates an example data placement policy data structure according to some implementations.

FIG. 8 illustrates an example capacity usage data structure according to some implementations.

DESCRIPTION

Figure 1:
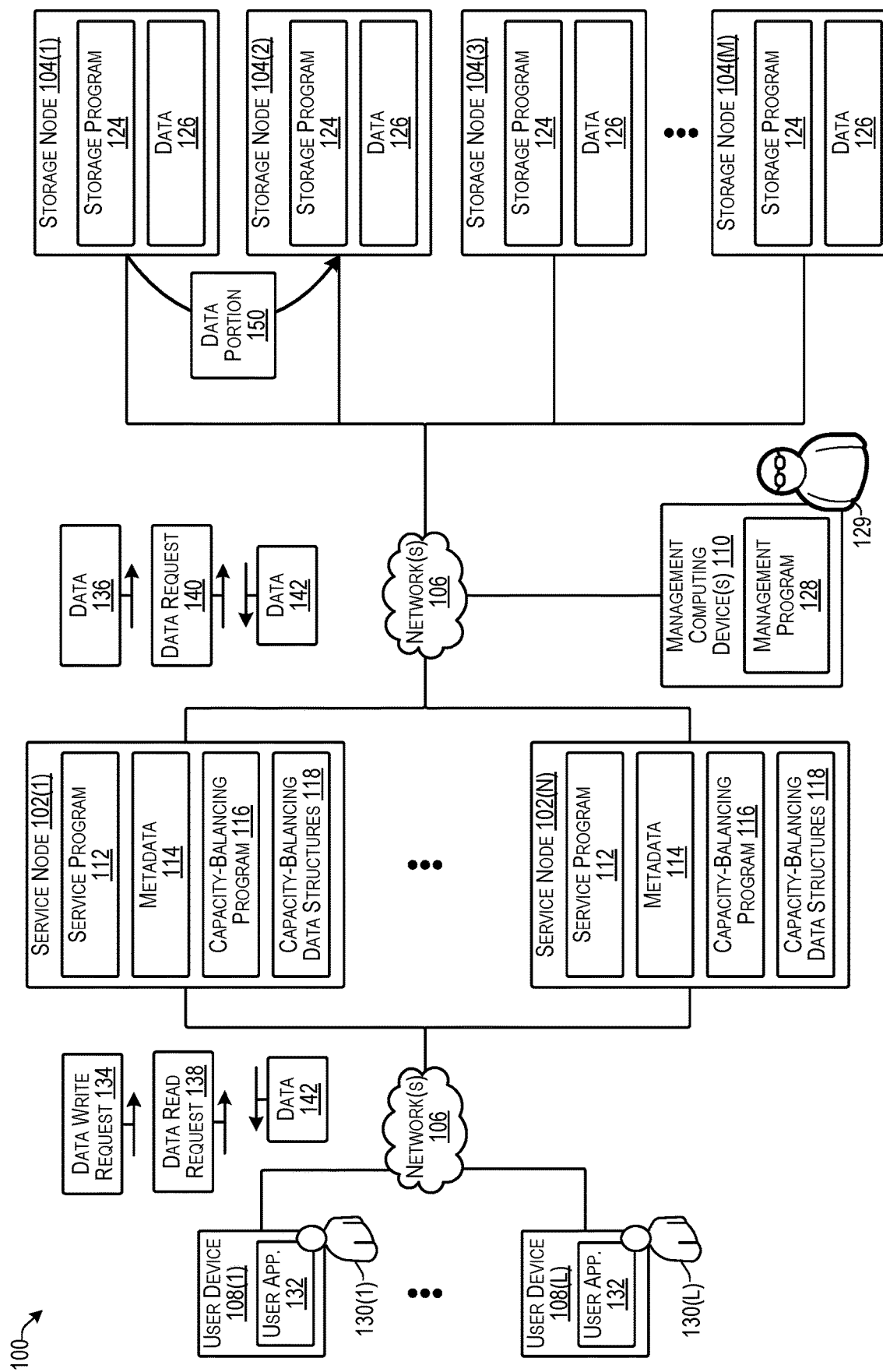
FIG. 1 illustrates an example architecture of a system able to perform capacity balancing of available storage capacity according to some implementations.

Some implementations herein are directed to techniques and arrangements for balancing available storage capacity in a data storage system that includes a plurality of storage computing devices (also referred to herein as "storage nodes"). For example, the system may include multiple computing devices including a plurality of storage nodes that are configured to store data content. Furthermore, the system may include one or more service computing devices (also referred to herein as "service nodes") that may perform a server function for client user devices by managing the storage and retrieval of data for the user devices. For instance, the service nodes may store metadata that describes the stored data stored by the storage nodes. The metadata may be used to access and retrieve the stored data stored by the storage nodes. Further, a system administrator may be able to add more service nodes and storage nodes to the system, such as to improve performance and capacity of the system.

In some examples, the system is able to balance the storage capacity usage among the plurality of storage nodes and efficiently control data movement between the storage nodes. The system may refer to a data placement policy to estimate current and upcoming capacity usage. Further, the system may determine if data movement is desirable for achieving capacity balancing, may determine the most suitable source and destination storage nodes for the data movement, and may determine the throughput desired for optimal efficiency for the data movement. Accordingly, the examples herein provide a technical improvement to storage systems by balancing capacity usage of the storage nodes and thereby preventing the storage nodes from running out of available capacity, while also employing minimal resources for data movement so that the impact of data movement on system performance is minimized.

As one example, changes in a data placement policy (or insufficient changes in a data placement policy) may necessitate capacity balancing of available capacity among the storage nodes in the system. Changes in the data placement policy may be caused, e.g., by adding storage nodes, retiring storage nodes, system configuration changes, user requirement changes, or various other actions that may be performed in large-scale storage systems. The system herein may respond to imbalances caused due the data placement policy or other causes by performing desired capacity balancing with efficient data movement based on predicted future available capacities. Thus, the system may determine and control the movement of data between the storage nodes for capacity balancing so that the data movement is performed efficiently without significantly impacting users of the system.

In some implementations, the storage system may store data received from user devices. The data may include information that a user requests to write to the storage or otherwise store in the storage. For example, the stored data may include content data, such as documents, music, movies, images, multimedia, and various other types of files, data object content, and so forth. When a user device sends to the system a request to write data, the system may apply a data placement policy to determine in which storage node the particular data is to be stored. Furthermore, the system may generate and/or store metadata that describes the stored data and the location of the stored data. When a user device sends to the system a request to read data, a service node may use the metadata to determine the storage node where the data is stored, retrieve the data therefrom, and may return the requested data to the user device.

The system may execute a capacity-balancing program, such as periodically or in response to the occurrence of an event or other type of trigger. The capacity-balancing program may be executed to detect an unbalanced available capacities in the storage nodes, estimate whether the unbalance condition will correct itself over time based on the data placement policy. If the data placement policy will not correct the unbalance or not correct the unbalance quickly enough, the capacity-balancing program may identify one or more storage nodes from which to move data, and one or more storage nodes to receive data. The capacity-balancing program may then determine a suitable data movement speed for moving the data from the source storage node(s) to the destination storage node(s) while having minimal impact on system performance.

For discussion purposes, some example implementations are described in the environment of a plurality of storage nodes in communication with a plurality of service nodes that enables capacity balancing of available storage among the storage nodes. However, implementations herein are not limited to the particular examples provided, and may be extended to other types of computing system architectures, other types of storage environments, other types of client configurations, other types of data, and so forth, as will be apparent to those of skill in the art in light of the disclosure herein. For instance, the system herein may balance the capacity usage among a plurality of storage nodes that store data content. However, examples herein are not limited to data that is distributed among storage nodes but also to data that may be distributed among logical partitions or devices. Furthermore, the examples herein may be extended to other types of storage and storage devices, such as block storage systems that may be accessed via iSCSI, Fibre Channel, Fibre Channel over Ethernet, and the like. Accordingly, implementations herein are not limited to use with the particular examples provided.

FIG. 1 illustrates an example architecture of a system 100 able to perform capacity balancing of available storage capacity according to some implementations. The system 100 includes a plurality of service computing devices, also referred to as service nodes 102(1)-102(N), which are able to communicate with, or otherwise coupled to, a plurality of data storage computing devices, also referred to as storage nodes 104(1), 104(2), 104(3), . . . 104(M), such as through one or more networks 106. Further, the service nodes 102 are able to communicate over the network(s) 106 with one or more user computing devices, such as user devices 108(1)-108(L), which may be any of various types of computing devices, as discussed additionally below. In addition, one or more management computing devices 110 are able to communicate with the service nodes 102 and the storage nodes 104, such as through the network(s) 106.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail.

In some cases, the network(s) 106 may be implemented as two or more separated networks. As one example, the network(s) 106 may include a frontend network for transmitting communications, such as read and write requests, between user devices and the service nodes 102. Further, in some examples, the network(s) 106 may include a backend network for transmitting communications between the service nodes 102 and the storage nodes 104, and a management network for enabling communication between the management computing device(s) 110, the service nodes 102 and the storage nodes 104. Regardless of the network type, the service nodes 102, the storage nodes 104, the user devices 108, and the management computing device(s) 110 are able to communicate over the one or more networks 106 using wired and wireless connections, or combinations thereof.

The service nodes 102 may include one or more servers or any other suitable computing devices, as discussed additionally below, e.g., with respect to FIG. 2. The service nodes 102 may each include a service program 112 that may be executed on each service node 102 to enable the service nodes 102 to respond to requests from the user devices 108, such as for storing user data, providing access to stored data, and so forth. Further, the service program 112 may manage storage of metadata 114 that is related to the stored data and that may also include system metadata that is generated by the service program 112, such as for determining an internal name, storage location, storage path, or the like, for each stored data object or other stored data. Thus, the metadata 114 may include information about the stored data and may further include information regarding where the data is stored by the storage nodes 104, such as to enable storing and accessing the data stored by the storage nodes 104. In some examples, the metadata 114 may be stored by the service node 102 in a database or other type of data structure managed by the service program 112.

In addition, one or more of the service nodes 102 may include a capacity-balancing program 116 that may be executed on individual ones of the service nodes 102(1)-102(N) to enable one or more of the respective service nodes 102(1)-102(N) to perform capacity balancing on the storage nodes 104(1)-104(M). When performing capacity balancing, the capacity-balancing program 116 may employ a plurality of capacity-balancing data structures 118, which are discussed additionally below. Additionally, while the capacity-balancing program 116 is illustrated as being installed on multiple service nodes 102 in this example, in other examples, the capacity-balancing program 116 may be installed on a single service node 102, may be installed and executed on the management computing device 110, and/or may be installed and executed on one or more of the storage nodes 104.

The storage nodes 104 may include one or more servers, storage systems, storage controllers, storage arrays, network storage, and/or any other suitable computing devices able to store data, as discussed additionally below, e.g., with respect to FIG. 3. For instance, individual storage nodes 104 may execute a storage program 124 for managing the storage of data 126 by the respective storage nodes 104. The storage nodes 104 may be configured by the storage program 124 to store the data 126 when received from the service nodes 102, and to retrieve the data 126 when requested by the service nodes 102. In addition, the storage program 124 may configure the storage nodes 104 to perform various other storage functions, such as for providing redundancy, remote replication, archiving, storage protection levels, storage class hierarchies, disaster recovery, garbage collection, and so forth.

The management computing device(s) 110 may execute a management program 128 that may be used by an administrator 129 for managing the system 100. For example, the administrator 129 may be responsible for adding more service nodes 102 and/or storage nodes 104 to the system 100. In addition, the administrator 129 may be responsible for configuring and managing the nodes 102, 104 in the system 100 for ensuring proper operation, as is known in the art.

Each user device 108 may be any suitable type of computing device such as a desktop, laptop, tablet computing device, mobile device, smart phone, wearable device, and/or any other type of computing device able to send data over a network. Users 130(1)-130(L) may be associated with user devices 108(1)-108(L), respectively, such as through a respective user account, user login credentials, or the like. Furthermore, the user devices 108 may be able to communicate with the service nodes 102 through the one or more networks 106 or through any other suitable type of communication connection.

Further, each user device 108(1)-108(L) may include a respective instance of a user application 132 that may execute on the respective user device 108(1)-108(L), such as for communicating with the service program 112, e.g., for sending user data for storage on the storage nodes 104 and/or for receiving stored data from the storage nodes 104. In some cases, the user application 132 may include a browser or may operate through a browser, and the service program 112 may include a web application for enabling the user 130 to access stored data 126 through one of the service nodes 102. Alternatively, in other cases, the user application 132 may include any other type of application having communication functionality enabling communication with the service program 112 over the one or more networks 106. In the system 100, the users 130 may store data to, and receive data from, the service nodes 102 that their respective user devices 108 are in communication with. Accordingly, one or more of the service node 102 may provide local storage for the users 130 and respective user devices 108. During steady state operation there may be multiple users 108 periodically communicating with respective ones of the service nodes 102 for storing and retrieving data.

In the example of FIG. 1, suppose that a first user 130(1) uses the user application 132 to send a data write request 134 from the first user device 108(1) to the first service node 102(1) for storing data 136. The service program 112 may be executed on the first service node 102(1) to send the data 136 to a selected one of the storage nodes 104, such as based on techniques described additionally below. In some cases, the data 136 may be compressed and/or encrypted by the service program 112 before sending to the storage node 104. The service program 112 on the service node 102(1) may further generate and store metadata for the data 136, and may store this metadata as part of the metadata 114. The storage program 124 executing on the storage node 104 may receive the data 136, and may store the data 136 as part of the data 126 stored and managed by the storage node 104.

In addition, the first user 130(1) may send a data read request 138 to the first service node 102(1) to request that certain data be provided by the service node 102(1). In response, the service node 102(1) may execute the service program 112 to access the metadata 114 to determine the storage location of the requested data. The service program 112 causes the service node 102(1) to send a data request 140 to the identified storage node 104 to retrieve the requested data. In response, the storage program 124 executing on the storage node 104 may receive the data request 140, may retrieve corresponding data 142 from the data 126 managed by the storage node 104, and may send the data 142 to the service node 102(1). The service program 112 on the service node 102(1) may perform any decryption or decompression of the data 142 if necessary, and may send the data 142 to the user device 108(1).

In some examples, when a user device 108 sends, to a service node 102, a write request 134 to write data 136, the service program 112 on the service node 102 may apply a data placement policy to determine at which storage node 104 the data 136 is to be stored. The service node 102 may select a target storage node 104 for storage of the data 136 based on the data placement policy. The service node 102 sends, to the selected storage node 104, a request to store the data received from the user device 108. In some example, the data may be streamed from the user device 108 through a memory buffer at the service node 102 to the storage node 104 so that the data does is not stored at the service node 102. Similarly, when retrieving data from a storage node 104, the data may be streamed through a memory buffer at the service node 102 and sent to the user device 108 so that the retrieved data does is stored in its entirety at the service node 102.

In addition, when a user device 108 sends, to a service node 102, a request to delete data, the service node 102 determines, from the metadata 114, the storage node 104 that stores the specified data. The service node 102 may send a request to delete the specified data to the identified storage node 104. The storage program 124 may mark the specified data as deleted and the data itself may eventually be overwritten, may be subject to garbage collection, may be overwritten immediately, or other desired deletion policy may be applied.

In the example of FIG. 1, suppose that, e.g., over a period of time, the storage nodes 104 become unbalanced regarding the amount of data 126 stored at the individual storage nodes 104. In response, to achieve capacity balancing, the service node 102 may cause data to be moved from one storage node 104 to another storage node 104. For instance, suppose that the capacity-balancing program 116 is executed on the first service node 102(1) and determines to move data portion 150, from storage node 104(1) to storage node 104(2). As one example, to accomplish the data movement, the service node 102(1) may send, to the storage node 104(1), a read request for the data portion 150, and may send, to the storage node 104(2), a write request for the data portion 150 to be stored by the storage node 104(2). Subsequently, the service node 102(1) may send, to the storage node 104(1), a delete request to delete the data portion 150 from the storage node 104(1). In some cases, the data being moved may be streamed through a buffer on the service node 102(1) so that the data portion 150 does not need to be stored by the service node 102(1).

Alternatively, in other examples, the storage program 124 executed on the storage node 104(1) and 104(2) may support transferring data directly from one storage node 104 to another storage node 104. For example, the service node 102(1) may send an instruction to the first storage node 104(1) to transfer the specified data portion 150 to the second storage node 104(2), and may send an instruction to second storage node 104(2) to receive and store the data portion 150 from the first storage node 104(1). Various other data movement techniques will be apparent to those of skill in the art having the benefit of the disclosure herein.

Furthermore, while one example configuration of a system is described with reference to FIG. 1, numerous other configurations will be apparent to those of skill in the art having the benefit of the disclosure herein. For instance, in the example of FIG. 1, the service node 102, the storage node 104, and the management computing device 110 are illustrated as separate physical computing devices. However, in other examples, some or all of these computing devices 102, 104, and 110 may be implemented as a single physical computing device. In other words, individual nodes in the system 100 may be configured to function concurrently as at least one of, or all of, a service node 102, a storage node 104, and a management computing device 110.

Figure 2:
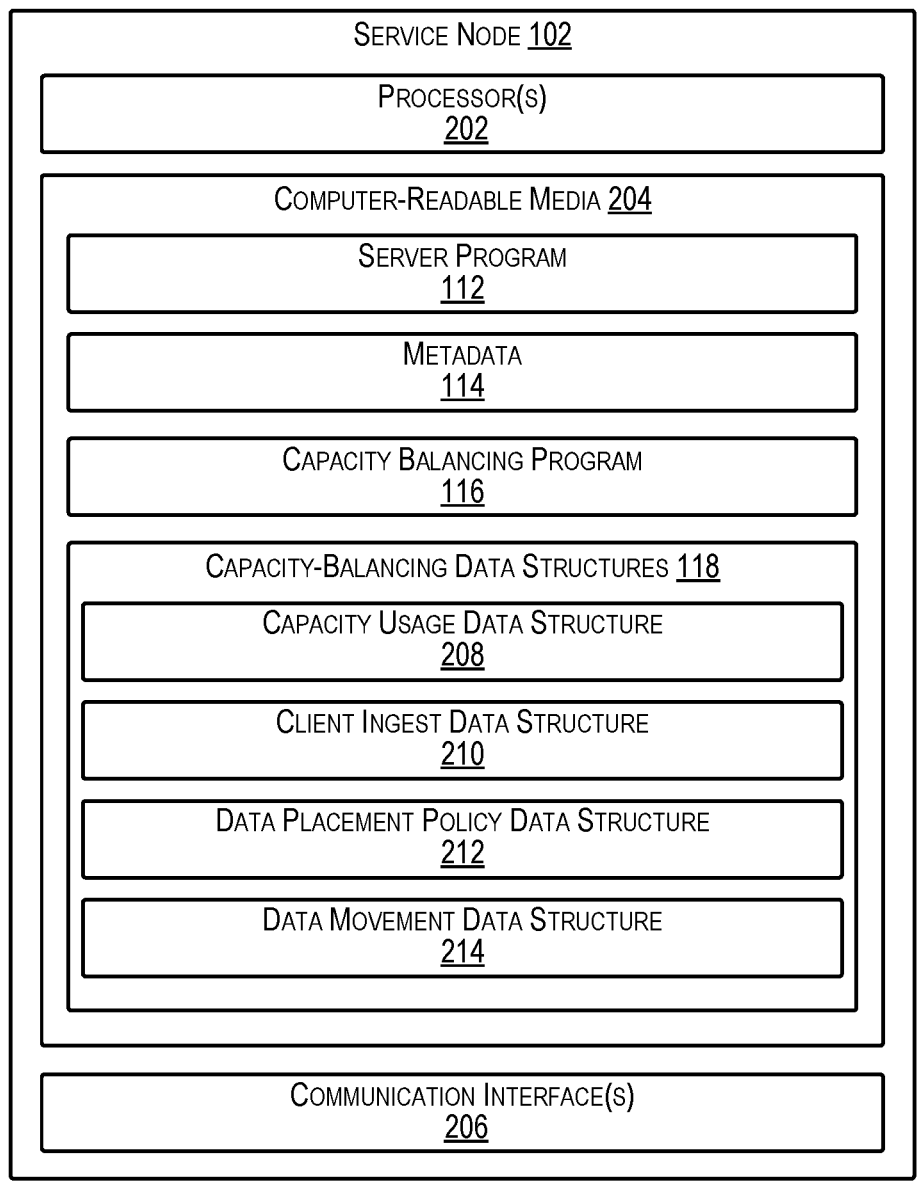
FIG. 2 illustrates an example hardware and logical configuration of a service node according to some implementations.

FIG. 2 illustrates an example hardware and logical configuration of a service node 102 according to some implementations. In some examples, the service node 102 may include one or more servers that may be embodied in any number of ways. For instance, the programs, other functional components, and at least a portion of data storage of the service node 102 may be implemented on at least one server, such as in a cluster of servers, a server farm, a data center, a cloud-hosted computing service, and so forth, although other computer architectures may additionally or alternatively be used. In the illustrated example, the service node 102 includes, or may have associated therewith, one or more processors 202, one or more computer-readable media 204, and one or more communication interfaces 206.

Each processor 202 may be a single processing unit or a number of processing units, and may include single or multiple computing units, or multiple processing cores. The processor(s) 202 may be implemented as one or more central processing units, microprocessors, microcomputers, microcontrollers, digital signal processors, state machines, logic circuitries, and/or any devices that manipulate signals based on operational instructions. As one example, the processor(s) 202 may include one or more hardware processors and/or logic circuits of any suitable type specifically programmed or configured to execute the algorithms and processes described herein. The processor(s) 202 may be configured to fetch and execute computer-readable instructions stored in the computer-readable media 204, which may program the processor(s) 202 to perform the functions described herein.

The computer-readable media 204 may include both memory and storage. For example, the computer-readable media 204 may include volatile and nonvolatile memory and/or removable and non-removable media implemented in any type of technology for storage of information, such as computer-readable instructions, data structures, program modules, or other data. The computer-readable media 204 may include, but is not limited to, RAM, ROM, EEPROM, flash memory or other memory technology. Further, the computer-readable media 204 may include optical storage, solid-state storage, magnetic tape, magnetic disk storage, RAID storage systems, storage arrays, network-attached storage, storage area networks, cloud storage, or any other medium that can be used to store the desired information and that can be accessed by a computing device. Depending on the configuration of the service node 102, the computer-readable media 204 may include a tangible non-transitory media to the extent that, when mentioned, non-transitory computer-readable media exclude media such as energy, carrier signals, electromagnetic waves, and/or signals per se. In some cases, the computer-readable media 204 may be at the same location as the service node 102, while in other examples, a portion of the computer-readable media 204 may be partially remote from the service node 102. For instance, in some cases, the computer-readable media 204 may include a portion of storage in one or more of the storage nodes 104.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the service node 102. Functional components stored in the computer-readable media 204 may include the service program 112 and the capacity-balancing program 116, each of which may include one or more computer programs, applications, executable code, or portions thereof. For example, the service program 112 may provide communication functionality with the user devices 108 and the storage nodes 104, as well as managing the metadata 114.

The capacity-balancing program 116 may be configured to perform the capacity-balancing operations described herein. For example, the capacity-balancing program 116 may monitor the capacity of each of the storage nodes 104, such as periodically, when triggered by the service program or through various other techniques and may perform capacity balancing among the storage nodes 104, as described in additional detail elsewhere herein. Further, while the capacity-balancing program 116 is illustrated on the service node 102 in this example, in other examples, the capacity-balancing program 116 may be executed on the management computing device 110 or on one or more of the storage nodes 104.

In addition, the computer-readable media 204 may store data, data structures, and other information used for performing the functions and services described herein. For example, the computer-readable media 204 may store the metadata 114. In addition, the computer-readable media 204 may store the capacity-balancing data structures 118, which may include a capacity usage data structure 208, a client ingest data structure 210, a data placement policy data structure 212, and a data movement data structure 214. Details of each of the data structures 208-214 are discussed additionally below.

The service node 102 may also include or maintain other functional components and data, which may include programs, drivers, etc., and the data used or generated by the functional components. Further, the service node 102 may include many other logical, programmatic, and physical components, of which those described above are merely examples that are related to the discussion herein.

In implementations in which there is more than one server node 102, the service nodes 102 may store the same information in the capacity usage data structure 208, the client ingest data structure 210, the data placement policy data structure 212, and the data movement data structure 214. For instance, if the one of the capacity-balancing data structures 118 is modified, a modification request may be sent by the capacity-balancing program 116 performing the modifying to all the other service nodes 102 in the system 100 to ensure that capacity-balancing data structures 118 on all the service nodes 102 maintain the same content.

The one or more communication interfaces 206 may include one or more software and hardware components for enabling communication with various other devices, such as over the one or more network(s) 106. Thus, the communication interfaces 206 may include, or may couple to, one or more ports that provide connection to the network(s) 106 for communicating with the storage nodes 104, the other service nodes 102, the user devices 108, and the management computing device(s) 110. For example, the communication interface(s) 206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 3:
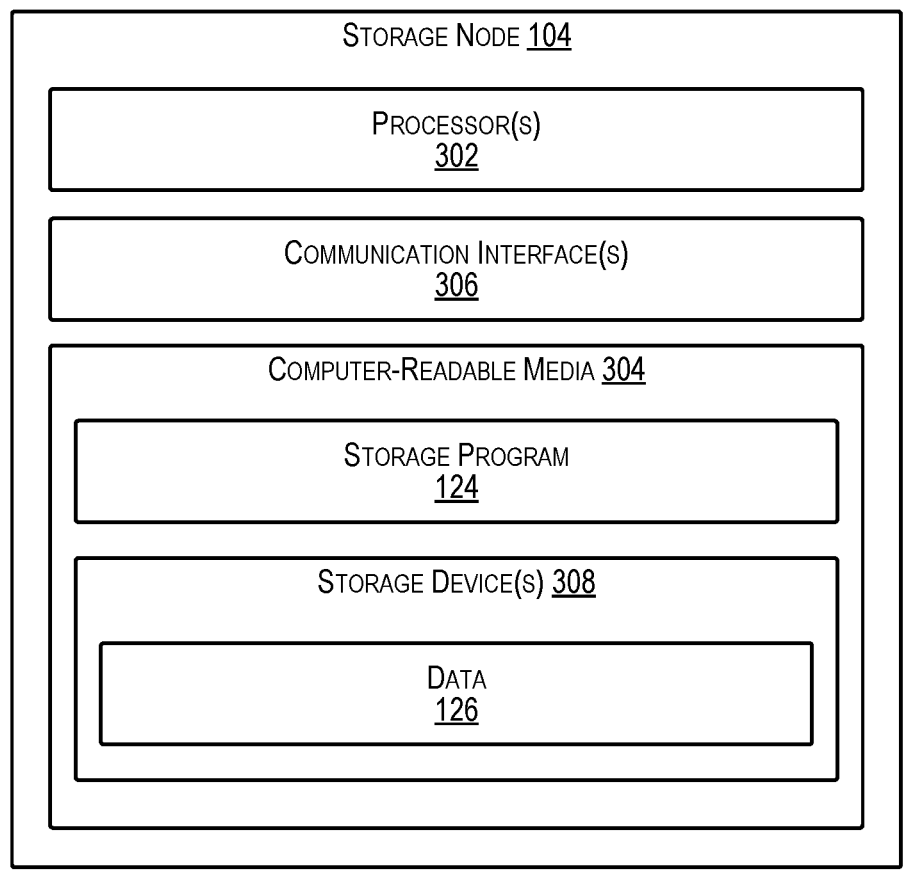
FIG. 3 illustrates an example hardware and logical configuration of a storage node according to some implementations.

FIG. 3 illustrates an example hardware and logical configuration of a storage node 104 according to some implementations. In some examples, the storage node 104 may include one or more servers that may be embodied in any number of ways. For instance, the programs, other functional components, and at least a portion of data storage of the storage node 104 may be implemented on at least one server, such as in a cluster of servers, a server farm, a data center, a cloud-hosted computing service, and so forth, although other computer architectures may additionally or alternatively be used. The storage nodes 104 may each include one or more processors 302, one or more computer-readable media 304, and one or more communication interfaces 306. For example, the processors 302 may correspond to any of the examples discussed above with respect to the processors 202, the computer-readable media 304 may correspond to any of the examples discussed above with respect to the computer-readable media 204, and the communication interfaces 306 may correspond to any of the examples discussed above with respect to the communication interfaces 206.

In the illustrated example, the computer-readable media 304 may include one or more storage devices 308 that may be used to store the data 126. In some examples, one or more dedicated storage controllers (not shown in FIG. 3) may be associated with the storage devices 308, such as in the case that the storage devices 308 are arranged in one or more arrays, or the like. For instance, as is known in the art, storage devices 308 may be configured in arrays, such as in a RAID configuration, JBOD configuration, or the like, and/or for presenting logical units based on the storage devices 308. The storage program 124 may be executed by the one or more processors 302 for managing the data 126, such as data objects or other data, stored on the underlying physical storage devices 308. As mentioned above, the storage devices 308 may be any type of storage device, such as hard disk drives, solid state drives, optical drives, magnetic tape, combinations thereof, or any other type of non-transitory computer-readable medium able to store electronic information. In some examples, the storage nodes 104 may include commercially available cloud storage as is known in the art, while in other examples, the storage nodes 104 may include private or enterprise storage systems accessible only by an entity associated with the service nodes 102.

The computer-readable media 304 may be used to store any number of functional components that are executable by the processor(s) 302. In many implementations, these functional components comprise instructions or programs that are executable by the processor(s) 302 and that, when executed, specifically program the processor(s) 302 to perform the actions attributed herein to the service node 102. Functional components stored in the computer-readable media 304 may include the storage program 124, which may include one or more computer programs, applications, executable code, or portions thereof. For example, the storage program 124 may be configured to perform the data storage and management functions described herein to cause the storage node 104 to store and retrieve received data, manage retention periods, provide storage protection levels, and so forth, as discussed above.

In addition, the computer-readable media 304 may store the data 126, which may include user data, data object content, data structures, system data and other information used for performing the functions and services described herein. The storage node 104 may also include or maintain other functional components and data, which may include programs, drivers, etc., and the data used or generated by the functional components. Further, the storage node 104 may include many other logical, programmatic, and physical components, of which those described above are merely examples that are related to the discussion herein.

FIG. 4 illustrates an example capacity usage data structure 208 according to some implementations. The capacity usage data structure 208 in this example includes a storage node ID 402 that indicates the identifier (ID) assigned to each storage node 104. For instance, the storage node ID 402 may be unique within the system 100 so that each storage node 104 is individually distinguishable based on its respective storage node ID 402.

The capacity usage data structure 208 further includes a total capacity 404 and an available capacity 406 for each node listed in the capacity usage data structure 208. For example, the total capacity may be the total storage capacity of each respective storage node, while the available capacity may be the amount of the total capacity on each respective storage node that is not currently being used to store data. The available capacity may also be expressed as a percentage of the total capacity (shown in parentheses), which may be used to determine an indication of the amount of data that may still be written compared to the total capacity. For example, the percentages of available capacity maybe useful for establishing thresholds for making capacity balancing decisions when a plurality of storage nodes 104 have different total capacities.

The capacity usage data structure 208 further includes estimated available capacity for a plurality of upcoming points in time, which in this example are "estimated available capacity after 1 day" 408, "estimated available capacity after 2 days" 410, "estimated available capacity after 3 days" 412, "estimated available capacity after 4 days" 414, and "estimated available capacity after 5 days" 416. In some examples, the capacity-balancing program may determine estimated available capacities for a plurality of respective future times, and may make capacity balancing decisions based on the estimations for the plurality of future times. For instance, the estimated available capacity may be determined based on current data policy settings and current ingest trend, as discussed additionally below. The upcoming points in time may be based on a time interval, such as a day (24 hours), 48 hours, 12 hours, 3 days, 10 days, or other desired time interval. Thus, implementations herein are not limited to any particular time period.

The capacity-usage data structure 208 may include one row for each storage node 104 that is available to the service node(s) 102. In this example, a first row 418 shows respective values for a selected storage node 104, i.e., having storage node ID SC1 and a second row 419 shows respective values for another selected storage node 104, i.e., having storage node ID SC2. In addition, a bottom row 418 shows a difference between the respective values for the storage nodes 104 SC1 and SC2. In the case in which there are more than two storage nodes, the difference row 418 may show the differences between the storage nodes having the larges and smallest values in the available capacity 406.

The capacity-balancing program 116 may be executed on a service node 102 to generate the capacity usage data structure 208 and may propagate any changes in the capacity usage data structure 208 to other service nodes 102. For example, a service node 102 that executes the capacity-balancing program 116 can add a new row to the capacity usage data structure 208 when a new storage node 104 is added to the system 100, or may remove a row if a corresponding storage node 104 is removed from the system 100. The service node 102 may update the capacity usage data structure 208 by periodically monitoring the storage nodes 104, such as through polling, receiving push notifications from the storage programs 124 on the storage nodes 104, or the like. For instance, the storage program 124 may be configured to periodically report the total and available capacity to the capacity-balancing program, such as via an application programming interface (API) or the like. As still another example, an administrator and/or the management program may periodically instruct the storage nodes 104 to send total and available capacity information to the service node 102. Other variations will be apparent to those of skill in the art having the benefit of the disclosure herein.

FIG. 5A illustrates an example client ingest data structure 210 according to some implementations. The client ingest data structure 210 includes an ingest throughput 502, which represents an aggregated ingest throughput from the user devices over a period of time. In the illustrated example, the aggregated ingest throughput from the user devices is indicated to be 75 TB per day.

For the example system discussed above with respect to FIG. 1, the ingest throughput 502 may indicate the aggregated ingest throughput received by the service nodes 102(1)-102(N) from the user devices 108(1)-108(L), which may be determined as the amount of data ingested from a given past point in time until a current time, per unit of time. The given past point in time may be based on a time interval, such as a day (24 hours), 48 hours, 12 hours, 3 days, 10 days, or other desired time interval. Thus, in the illustrated example, the value for the ingest throughput 502 indicates the amount of data ingested by the system 100 during the past day up until the current time.

A service node 102 or other computing device executing the capacity-balancing program 116 may update the information in the client ingest data structure 210 by monitoring the requests to write data and delete data that are sent from user devices 108(1)-108(L) to the storage nodes 104(1)-104(M). The value for ingest throughput 502 may be determined by subtracting the amount of data deleted from the amount of data written. For example if storage node 102(1) monitors the requests from user devices 108 received over the past day and finds that a first user device 108 has sent write requests for a total of 200 GB of data and delete requests for a total of 50 GBs of data, and a second user device 108 has sent write requests for a total of 500 GB of data, and delete requests for a total of 10 GB of data, then the value for ingest throughput for these tow users 130 may be calculated as 200 GBs−50 GB+500 GB−10 GB, which equals to 640 GB/day for these two users 130. Such calculations may be aggregated across all users 130 to determine the ingest throughput 502 for the system 100. The value of the ingest throughput 502 is expressed in TB/Day in this example, but may be expressed in different units such as MB/hour, KB/second, and so forth.

In some implementations, the system 100 might only monitor and store the ingest throughput for the most recent time interval. Alternatively, the system 100 may also monitor and store the previous time intervals to obtain a more accurate estimation of the ingest throughput 502 in the near future, e.g., for one or more upcoming time periods. For example, the system 100 may monitor the ingest throughput from one day ago until the current time, from two days ago until one day ago, from three days ago until two days ago, and so forth.

FIG. 5B illustrates an example data placement policy data structure 212 according to some implementations. The data placement policy data structure 212 includes a storage node ID 504 and a corresponding assigned weight 508 for the respective storage node 104. Accordingly, the data placement policy data structure 212 in this example indicates the data placement policy for the respective storage nodes 104 in a system 100 that has four storage nodes 104. Furthermore, while information for four storage nodes having node IDs SC1-SC4 are shown in this example, in other examples, there may be more or fewer storage nodes.

The assigned weight 508 may indicate the amount of data to be written to each storage node 104 SC1-SC4 when data is received by the system 100. In this example, a first storage node 104 SC1 has an assigned weight of 20 percent, a second storage node 104 SC2 has an assigned a weight of 47 percent, a third storage node 104 SC3 has an assigned weight of 13 percent, and a fourth storage node 104 SC4 has an assigned weight of 20 percent. When write commands are received from the user devices 108, the service nodes may distribute how the data is stored so that 20 percent of the data written by the user devices 108 will be stored in the first storage node 104 SC1, 47 percent of the data written by the user devices 108 will be stored in the second storage node 104 SC2, 13 percent of the data written by the user devices 108 will be stored in the third storage node 104 SC3, and 20 percent of the data written by the user devices will be stored in the fourth storage node 104 SC4. As one example, the storage nodes SC1, SC2 and SC4 may be able to handle a larger number of input/output operations per second (IOPS) than storage node SC3, so it may be desirable for performance purposes to have a data placement policy in which the storage nodes SC1, SC2 and SC4 receive a larger percentage of the data being written to storage than SC3.

The assigned weights 508 are one example of a technique for defining a data placement policy. For example, the data placement policy can be defined with the assigned weights 508 such that more data is ingested in a storage node 104 having higher performance. As another example, the data placement policy can be defined by assigned weights 508 that may be set by an administrator via the management computing device 110. In the illustrated example, the assigned weight is a numeric value from 0 to 100, and a total value of 100 for all assigned weights, although other weighting values and total weight may be used in other examples. To achieve capacity balance in some cases, the weights in the data placement policy data structure may be adjusted to achieve capacity balancing over time as additional data is stored to the system 100. In some cases, however, as discussed additionally below, the data placement policy weightings may be insufficient to achieve balance within a desired time, and to address this, the system may employ data movement to achieve available capacity balance among the storage nodes 104.

The data placement policy data structure 212 may include one row for each storage node 104 that is available to the service node(s) 102. The service node(s) 102 may update the values in the data placement policy data structure 212, such as in response to a management request received from the management computing device 110. For example, the management request may be sent by the action of the administrator 129, such as due to adding a new storage node 104 or removing a storage node 104. In addition, the capacity-balancing program 116 executing on a service node 102 may monitor the storage nodes 104, and may update the data placement policy data structure 212 periodically to achieve storage capacity balancing. For example, capacity-balancing program 116 may be executed to monitor the performance of the write requests sent to each storage node 104, and may periodically update the assigned weights 508 such that storage nodes 104 with higher performance have higher weights.

Furthermore, while the data placement policy in this example is based on assigned weights, the data placement policy definition is not limited to the use of assigned weights. For example, data placement policy may be defined based on characteristics of the storage nodes 104, attributes of the data being stored, or based on various other factors, as will be apparent to those of skill in the art having the benefit of the disclosure herein. Additionally, the basic scheme of the data placement policy may be based on a number of factors that are known in the art, such as load-balancing placement, round robin placement, random placement, and so forth.

Figure 6:
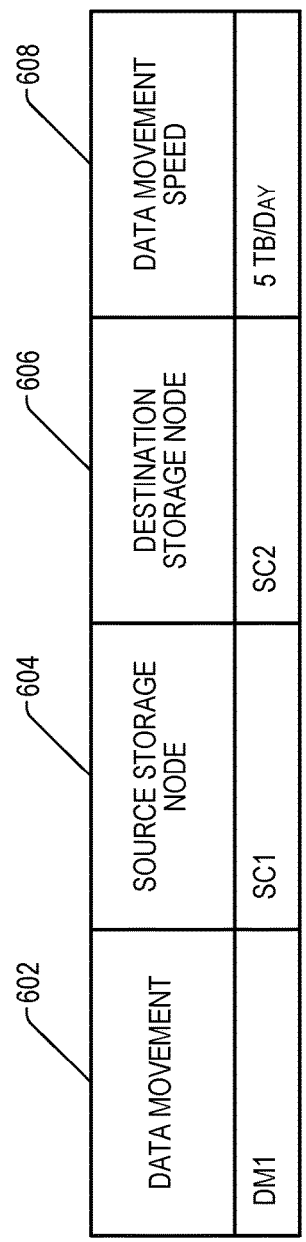
FIG. 6 illustrates an example data movement data structure according to some implementations.

FIG. 6 illustrates an example data movement data structure 214 according to some implementations. The data movement data structure 214 may indicate the movement of a designated data portion from one or more source storage nodes 104 to one or more destination storage nodes 104 at a designated data movement speed. In the illustrated example, the data movement data structure 214 includes a data movement process ID 602, a source storage node ID 604 for the respective data movement process, a destination storage node ID 606 for the respective data movement process, and a data movement speed 608 for the respective data movement process.

Each row of the data movement data structure 214 may include a specified storage node 104 as a source storage node 604. The destination storage node 606 may include a list of one or more storage node IDs, and may identify the storage nodes 104 that are the destination (target) of the data movement 602, i.e., the storage nodes 104 to which one or more data portions are to be moved.

The data movement speed 608 indicates the throughput that is to be used to move the data, e.g., as a value of amount of data per unit of time. If there is more than one storage node 104 identified as the destination storage node 606, the data movement speed 608 may be distributed among the storage nodes 104 identified as the destination storage nodes 606. For example, if there are two storage nodes 104 identified as destination storage nodes 606, and the specified data movement speed is 400 MB per second, the data movement activity may move 200 MB of data per second to each of the two storage nodes 104 identified as the destination storage nodes 606. The distribution among the destination storage nodes 606 may be determined in other ways. For example, the distribution may vary periodically depending on the load of the destination storage nodes 606, may be weighted to send more data to the destination storage node having higher performance, and so forth.

Figure 7:
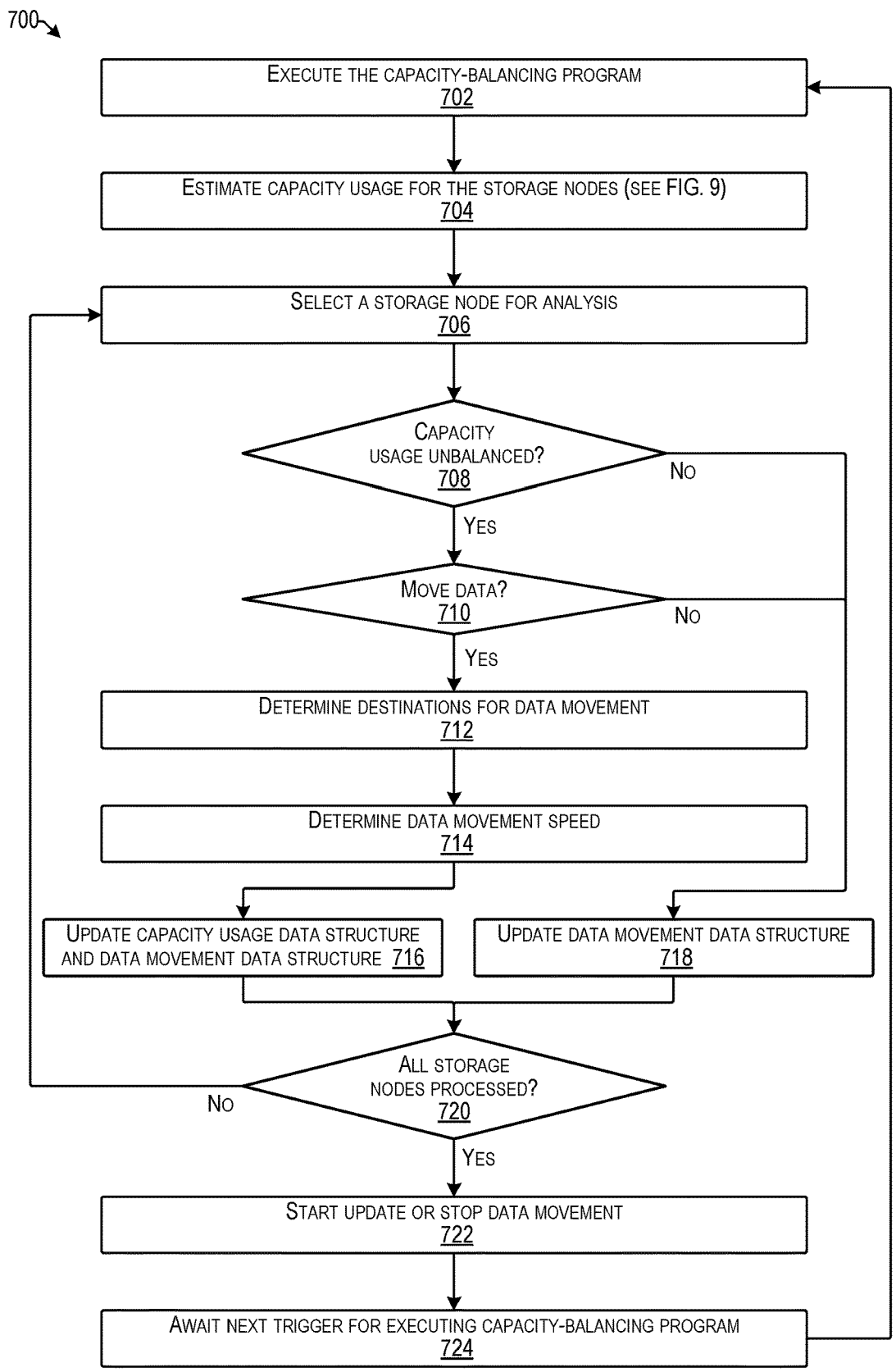
FIG. 7 is a flow diagram illustrating an example process for balancing available capacity that may be performed by a computing device executing the capacity-balancing program according to some implementations.
Figure 9:
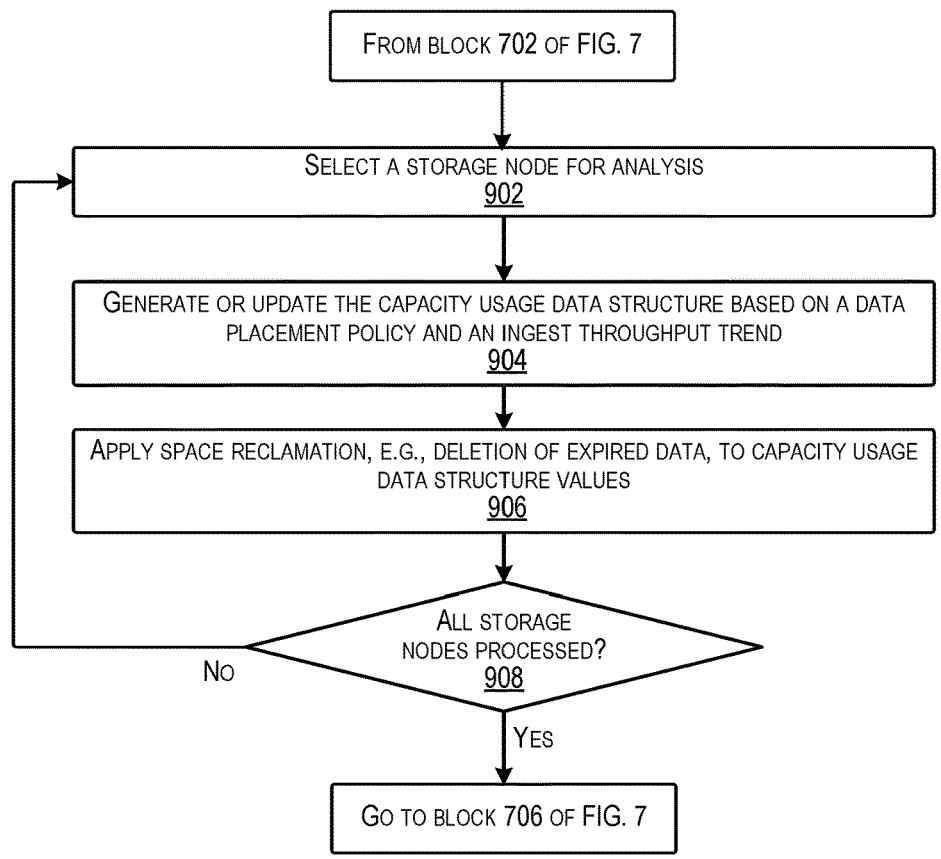
FIG. 9 is a flow diagram illustrating an example process for determining capacity usage that may be performed by a computing device executing the capacity-balancing program according to some implementations.

FIGS. 7 and 9 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 7 is a flow diagram illustrating an example process 700 that may be performed by a computing device executing the capacity-balancing program 116 according to some implementations. For example, a service node 102 or other suitable computing device, as discussed above, may execute the capacity-balancing program 116 to perform at least a portion of the process 700.

At 702, the computing device may execute the capacity-balancing program. For example, the capacity-balancing program may be executed in response to a periodic trigger, which may be configured to cause the capacity-balancing program to be executed every 24 hours, every 12 hours, every 6 hours, every 48 hours, or following the expiration of any other desired time period. Additionally, or alternatively, the capacity-balancing program may be executed in response to another type of trigger, such as the occurrence of an event or condition, e.g., a management request sent by an administrator via the management computing device 110, a change in the configuration of the storage nodes 104, a change in the configuration of the service nodes 102, the reaching of a threshold related to the capacity in the storage nodes 104, and so forth.

At 704, the computing device may estimate the capacity usage of the storage nodes 104. An example process for estimating the capacity usage of the storage nodes is described below with respect to FIG. 9.

At 706, the computing device may select a storage node for analysis. For example, the computing device may perform an iteration of the operations 708-720 for all the storage nodes 104 listed in the capacity usage data structure 208. After all the storage nodes 104 have been analyzed, the process may proceed to 722.

At 708, the computing device may determine, for the selected storage node 104, whether the capacity usage of the selected storage node 104 is unbalanced in relation to the other storage nodes 104 in the system 100. As one example, the capacity usage of a selected storage node 104 may be categorized as unbalanced if the percentage of available capacity of the selected storage node 104 is more than a threshold amount lower than the available capacity of the storage node 104 with the highest available capacity in the system 100. For instance, if the threshold is specified to be 20 percent, then if a selected storage node 104 has an available capacity that is more than 20 percent lower than the storage node 104 with the highest percentage of available capacity in the system, then the system may be designated as unbalanced, and capacity balancing may be performed.

Further, implementations herein are not limited to the above-described technique for determining an unbalanced system, For example, other techniques for identifying an unbalanced storage node in the system 100 may include determining, for a selected storage node 104, a degree of deviation of the percentage of available capacity of the selected storage node 104 from an average percentage of available capacity of all the storage nodes 104 in the system. Other variations will be apparent to those of skill in the art having the benefit of the disclosure herein.

To determine if the capacity usage of the selected storage node 104 being analyzed is unbalanced, the computing device may check the values of the capacity usage data structure 208, according to a specification of the system being unbalanced (e.g., based on a specified threshold). As one example, referring to the capacity usage data structure 208 discussed above with respect to FIG. 4, suppose that the storage node SC1 is the selected storage node 104 currently being analyzed, and that the storage node SC2 is the storage node 104 with the largest available capacity. In the example capacity usage data structure 208 of FIG. 4, the storage node SC1 has 22 percent available capacity, while the storage node SC2 has 52 percent available capacity. Accordingly, based on a threshold of 20 percent being the threshold for determining that the storage nodes are out of balance, the computing device may determine that the capacity usage is unbalanced because the difference between the percentage of available capacity for the storage node SC1 and the highest percentage of available capacity (i.e., for storage node SC2), is 30 percent, which is higher than the defined threshold of 20 percent. When the computing device determines that the capacity usage of the selected storage node 104 being analyzed is unbalanced, the process may continue to 710. Otherwise, the process goes to 718.

At 710, the computing device may determine whether to enforce a data movement activity to solve the capacity unbalance of the selected storage node 104 being analyzed. When determining whether to perform data movement, the computing device may check the values of the columns 408-416 of the capacity usage data structure 208, such as based on the specified test for determining unbalance as discussed above, e.g., with respect to 708. For example, based on the values in the example capacity usage data structure 208 discussed above with respect to FIG. 4, suppose that the selected storage node 104 being analyzed in the storage node SC1. Accordingly, the computing device may determine that data movement is need not be performed because after 5 days the storage node 104 SC1 will no longer be unbalanced. This determination may be reached because the difference between the percentage of estimated available capacity after 5 days 416 for storage node SC1 is 12 percent, and the highest percentage of estimated available capacity after 5 days 416 for storage node SC2 is 32 percent, so the difference between these two values is 20 percent, which does not exceed the specified threshold of 20 percent for determining unbalance.

The foregoing example demonstrates the utility of some implementations herein for determining whether or not it is desirable for data movement to be performed even in the case when the capacity usage of the storage nodes 104 is determined to be unbalanced. Avoiding performing data movement has a benefit to the users 130 of the system 100 because data movement may impact the performance of the system 100. Furthermore, if the data placement policy has changed recently, the user usage patterns with respect to each storage node 104 may not indicate that the unbalance will be resolved in 5 days without employing data movement.

In some examples, a time limit may be specified to ensure that the capacity unbalance resolved within the time limit. For example, the specified time limit may be set by an administrator via the management computing device 110. As one example, suppose that a time limit of 3 days has been specified. In this case, in the example capacity usage data structure 208 discussed above with respect to FIG. 4, the computing device may determine to implement data movement because after the time limit of 3 days the storage node 104 SC1 will still be unbalance based on the 20 percent threshold. The computing device may determine this outcome because the estimated available capacity after 3 days 412 is 16 percent for the storage node SC1 and the highest percentage of estimated available capacity after 3 days 412 for the storage node SC2 is 40 percent, which is a difference of 24 percent, and which is higher than the specified threshold of 20 percent. If the computing device determines at 710 that the storage node 104 being analyzed is unbalanced and that date movement is to be performed, the process goes to 712. Otherwise, the goes to 718 to remove a row for the selected storage node 104 being analyzed from the data movement data structure 214, if there was a row for the selected storage node 104 in the data movement data structure 214.

At 712, following determination that the capacity usage of the selected storage node 104 is unbalanced and that data movement is to be performed, the computing device may determine one or more of the storage nodes 104 to be the destination for the data movement. As one example, to determine a destination storage node 104, the computing device may check the values of the column 416 of the capacity usage data structure 208. The computing device may selects the storage node 104 with highest percentage of estimated available capacity after 5 days 416, so that the data movement becomes more effective. The data movement becomes more effective because the unbalance of the storage nodes 104 is reduced using the available capacity of the storage node 104 with highest percentage of available capacity, which is relevant in the specification for determining unbalance discussed above at 708.

Accordingly, implementations herein may select a destination storage node 104 according to the estimated available capacity after 5 days 416 based on the data placement policy. For example, selecting the storage node 104 based on the current available capacity values may not be as effective because after 5 days the data placement policy might cause the available capacity values to change significantly. In addition, usage patterns for each storage node 104 only may not be as useful because, for example, usage patterns are not available for any storage nodes 104 that were recently added to the system 100. For instance, based on the values in the capacity usage data structure 208 discussed above with respect to FIG. 4, if the computing device is analyzing the storage node SC1, the computing device may determine that the destination storage node should be the storage node SC2 because the storage node 104 SC2 has the highest percentage of estimated available capacity after 5 days 416, i.e., 29 percent. In some examples, the computing device may determine to divide the data movement among more than one storage node 104. For example, if another storage node 104 has a similar percentage of estimated available capacity after 5 days 416 as the storage node 104 with the highest percentage of estimated available capacity after 5 days 416 (e.g., within a threshold amount, such as 5 percent or less), then the computing device may determine to allocate the data movement between the two storage nodes having the highest percentage of estimated available capacity after 5 days 416.

At 714, the computing device may determine a minimum speed (e.g., throughput) to use for performing the data movement effectively. Several factors may be taken into consideration when determining the movement speed, and implementation herein are not limited to any of these factors. For example, if a time limit to resolve the unbalance has been established, then the data movement speed may be determined such that the resource usage is as small as possible while still ensuring data movement is completed within the specified time limit. As another example, if a time limit has not been specified, the computing device may determine to have the data movement performed at a speed such that the resource usage is as small as possible while ensuring that the unbalanced (lower available capacity) storage node(s) 104 do not run out of available capacity in the unbalanced state. The reasoning may be that if one of the storage nodes 104 runs out of available capacity while other storage nodes 104 have plenty of available capacity, the users 130 may experience a write performance that is far lower than expected because of the inability for data to be written to the full storage node 104. Thus, the total data stored may be considerably lower than the total aggregated capacity of the configured storage nodes 104.

To determine the speed (throughput) for the data movement, the computing device may checks the values of the capacity usage data structure 208. For example, based on the values of the capacity usage data structure 208 discussed above with respect to FIG. 4, suppose that the computing device is analyzing the storage node SC1 and there is a time limit of 3 days in effect to resolve the capacity unbalance. The computing device may determine that the minimum speed (throughput) to be applied for data movement is 5 TB/day because that data movement speed causes the difference of percentage of estimated available capacity after 3 days 412 to be 20 percent, which is the defined threshold for balance.

FIG. 8 illustrates an example capacity usage data structure 208 according to some implementations. The capacity usage data structure 208 in this example is updated due to reflect estimated capacities if data movement is applied to the capacity usage data structure 208 of FIG. 4. For example, as discussed with respect to FIG. 7 at operation 714, the estimated available capacities 408-416 may be updated, as illustrated in FIG. 8, by applying the data movement speed of 5 TB/day. As one example, the estimated available capacities 408-412 of storage node SC1 in row 418 may be lowered by 5 TB/day, and the estimated available capacity 408-412 of storage node SC2 in row 420 may be increased by 5 TB/day to simulate that a data portion equivalent to 5 TB is moved from storage node SC1 was to storage node SC2 each day from day 1 to day 3.

Further, the capacity usage data structure 208 of FIG. 8 illustrates that the difference of percentage of available capacity gradually decreases from a 24 percent difference in the capacity usage data structure 208 of FIG. 4, and reaches the desired threshold difference of 20 percent in the capacity usage data structure 208 of FIG. 8, such that the selected storage node SC1 is predicted to have an estimated available capacity of 145 TB after 3 days and the storage node SC2 is predicted to have an estimated available capacity of 340 TB after 3 days. Accordingly, because the simulation moved 15 TB from the storage node SC1 to the storage node SC2, and the time to reach balanced capacity is 3 days, 15 TB moved over 3 days=5 TB/day. Computation of the updated values for the capacity usage data structure 208 of FIG. 8 and the data movement data structure of FIG. 6 is described additionally below at 716.

Returning to FIG. 7, at 716, the computing device may update the capacity usage estimation(s) for the data movement data structure 214 and the capacity usage data structure 208 based on the data movement activity determined at 712 and 714. The data movement data structure 214 of FIG. 6 may be updated as follows. If there is a row in the data movement data structure 214 with the source storage node 604 being analyzed, the computing device updates the values of that row. Otherwise, the computing device may create a new row. In the new row or when updating an existing row, the computing device may set the value of the destination storage node(s) 606 based on the determination of the destination storage node(s) at 712 above. In addition, the value of the data movement speed 608 may be the value determined at 714 above.

In addition, the capacity usage data structure 208 may be updated as follows. In the row of the storage node being analyzed, the data movement speed determined at 714 may be added to the available capacity values of the cells in the columns 408-416, taking into account that the available capacity increase is accumulated from a first time interval to a future time interval, e.g., days 1-5 in this example. In the row for the destination storage node 104, the data movement amount is subtracted from the available capacities in the cells, taking into account that the available capacity reduction is accumulated from a first time interval to a future time interval, e.g., days 1-5 in this example.

As one example, based on the values in the capacity usage data structure 208 discussed above with respect to FIG. 4, if the storage node 104 being analyzed is storage node SC1, the destination storage node 104 is storage node SC2, and the data movement speed is 5 TB/day, the value of the cell in row 418 and column 407 is updated from 160 TB to 165 TB; the value of the cell in the row 418 and column 410 is updated from 145 TB to 155 TB; and the value of the cell in row 418 and column 412 is updated from 140 TB to 155 TB. This increase in 15 TB is because the estimation is after three days is 5 TB per day×3 days=15 TB.

Similarly, the values of the cells in row 420 are updated to reflect the data movement. For example, the value of the cell at row 420 and column 408 is updated from 425 TB to 420 TB; the value of the cell at row 420 and column 410 is updated from 390 TB to 380 TB; and the value of the cell at row 420 and column 412 is updated from 355 TB to 340 TB. This decrease in 15 TB is because the estimation is after three days, so 5 TB per day×3 days=15 TB. Thus, based on the values in the capacity usage data structure 208 of FIG. 4, when the selected storage node 104 being analyzed is storage node SC1, the destination storage node 104 is SC2, the speed is 5 TB/day, the updated data movement data structure 214 is as illustrated in FIG. 6, then the updated capacity usage data structure 208 is as illustrated in FIG. 8.

In addition, in the example of FIG. 8, the data movement is projected to continue until the computing device executes the capacity-balancing program again at a future time. Accordingly, in the updated capacity usage data structure 208 of FIG. 8, the value of the cell at row 418 and column 414 is 135 TB and the value of the cell at row 418 and column 416 is 125 TB (i.e., 5 TB/day×5 days=25 TB) rather than the previous 100 TB total in FIG. 4. The values in the cells for row 420 at columns 414 and 416 are similarly reduced by an additional 5 TB per day. As mentioned above, in some examples, the capacity-balancing program may be set to execute daily or at various other more frequent intervals, so after three days, if balance has been achieved for the storage node SC1, the data movement may be ceased before being performed on days 4 and 5. Other variations will be apparent to those of skill in the art having the benefit of the disclosure herein.

After all the values for the estimated available capacities 408-416 are updated, the percentages are also updated, as described above with respect to FIG. 4 in the explanation for the capacity usage data structure 208. In some examples, after updating the capacity usage data structure 208 as illustrated in FIG. 8, the computing device may check whether the updated capacity usage data structure 208 of FIG. 8 changes any conclusions reached in previous iterations of the process 700 for other storage nodes 104, and if so, the computing device may repeat the previous analysis of the other storage nodes in the system 100.

At 718, if the computing device determines at 708 that there is not a sufficient imbalance between the selected storage node 104 being analyzed and the storage node 104 with the highest available capacity, or if the computing device determines at 710 that data movement will not be performed for the selected storage node 104, the computing device may remove a row for the selected storage node 104 from the data movement data structure 214, if there was a row for the selected storage node 104 being analyzed in the data movement data structure 214.

At 720, the computing device may determine whether all storage nodes 104 in the system 100 have been subject to analysis for determining whether they are unbalanced. For example, the computing device may iterate through all the storage nodes 104 listed in the capacity usage data structure 208 or other listing of the storage nodes 104 included in the system 100. After all storage nodes 104 have been processed and analyzed, the process 700 may proceed to 722. Otherwise, if more storage nodes 104 are to be analyzed, the process may return to 706 to select a next storage node 104 for analysis.

At 722, the computing device may start, update or stop data movement activity according to the values in the updated data movement data structure 214. For new rows added to the data movement data structure 214, data movement activity may be started. For any rows deleted from the data movement data structure 214, the data movement activity may be canceled and stopped. For rows updated in the data movement data structure 214, data movement activity may be updated, which may include updating the data movement speed 608 and/or updating the destination storage node(s) 606.

In some examples, the service node(s) 102 may receive instructions from the capacity-balancing program to perform the data movement activity. Alternatively, if the storage program 124 on the storage nodes 104 supports direct reading or writing data between the storage nodes 104, service node(s) 102 can issue a copy command to the source and destination storage nodes 104 so that the data movement does not use resources at the service nodes 102.

The service nodes 102 may select data portions to be moved based at least in part on a data placement policy, data grouping policy, data naming policy, or the like. For example, if the data is stored in the storage nodes based on assigned internal names (e.g., determined based on a hash value or the like), then a contiguous data portion, such as a data partition, data name range, or the like, may be selected for data movement to simplify subsequent retrieval of the data and updating of the metadata 114 that indicates the storage location of the moved data portion(s).

Furthermore, after the data movement is started, the data movement might not run continuously. For example, the data movement activity may be performed only at given periods of time or at times when the resource usage is below a threshold. When there is more than one service node 102, the data movement activity may be distributed among the service nodes 102 and performed in parallel by more than one service node 102.

At 724, the computing device may await the next trigger for executing the capacity-balancing program 116. Non-limiting examples of some possible types of triggers are discussed above at 702.

FIG. 9 is a flow diagram illustrating an example process 900 for determining capacity usage that may be performed by a computing device executing the capacity-balancing program 116 according to some implementations. For example, a service node 102 or other suitable computing device, as discussed above, may execute the capacity-balancing program 116 to perform at least a portion of the process 900. In some examples, the process 900 may be performed at block 704 of FIG. 7.

At 902, following initiation of execution of the capacity-balancing program 116 at block 702 of FIG. 7, the computing device may select a storage node 104 for analysis. For example, the computing device may perform an iteration of the operations 902-910 for all the storage nodes 104 listed in the capacity usage data structure 208. After all the storage nodes 104 have been analyzed, the process may go to block 706 of the process 700 of FIG. 7.

At 904, the computing device may generate and/or update the capacity usage data structure 208 discussed above with respect to FIG. 4. For instance, columns 406-416 of the capacity usage data structure 208 may be generated/updated by the computing device executing the capacity-balancing program 116. For example, the current available capacity 406 may be determined from current capacity information obtained from each of the storage nodes 104. Furthermore, each cell of the columns 408-416 may be updated as follows. First, the computing device may retrieve the assigned weight 508 for the selected storage node 104 of a row in the data placement policy data structure 212 by matching the storage node IDs 402 and 504 in the respective data structures 208 and 212. The computing device may also determine the ingest throughput 502 from the client ingest data structure 210.

The value of estimated available capacity for each cell of columns 408-416 in the capacity usage data structure 208 may be computed as the value in the adjacent cell to the left minus the result of multiplying the retrieved assigned weight 508 by the retrieved ingest throughput 502. For example, in the capacity usage data structure 208 of FIG. 4 the value for the cell in column 408 and row 418 may be computed as the value in the adjacent cell to the left (175 TB) minus the assigned weight for SC1 (20 percent) multiplied by the ingest throughput 75 TB/day, i.e., 175 TB−20%×75 TB=175 TB−15 TB=160 TB. In this example, the time interval between two adjacent columns is one day. If the time interval between two adjacent columns is, for example, 2 days, then the ingest throughput 502 may be adjusted to that time interval, i.e. 75 TB/day in 2 days=150 TB.

After the value for the estimated available capacity is computed for the columns 408-416, the percentage (%) in each cell may be computed as the ratio between the value of the cell and the total capacity 404 of the selected storage node 104 in the row. For example, in FIG. 4, the percentage value for the cell in column 408 and row 418 is computed as the ratio between the cell value (160 TB) and the total capacity (800 TB). In conclusion, the percentage value for 160 TB is 20 percent of 800 TB. Finally, the cells in the last row for the columns 406-416 may be calculated as the difference between the highest and lowest percentage value in the cells of each column. For example, in FIG. 4, the value for the cell in column 406 and row 422 is computed as the highest percentage (52 percent) minus the lowest percentage (22 percent), i.e., the value is 52%−22%=30%.

In this example, the values in the capacity usage data structure 208 in FIG. 4 are computed according the procedure described herein for block 904. As discussed above with respect to FIG. 7, the values in the capacity usage data structure 208 in FIG. 8 may be computed according to the procedure described above at block 716 of FIG. 7. Thus, the capacity usage data structure 208 of FIG. 4 represents the capacity usage in the system 100 before capacity balancing is applied and the capacity usage data structure 208 of FIG. 8 has been subsequently updated to represent capacity usage in the system 100 based on the capacity balancing to be applied by data movement.

At 908, in some examples, the computing device may further refine the estimated available capacities in the columns 408-416 of the capacity usage data structure 208 when there is available knowledge regarding space reclamation in the storage nodes 104. For instance, in some cases data that is written to the storage nodes 104 may include an expiration date so that when the expiration date is reached the written data may be automatically deleted from the storage node 104. By making the automatic expiration date information available to the capacity-balancing program, this information may be used to increase the estimated available capacity for the storage node that stores data that is scheduled to expire within the time range of the estimation. For example, if 10 TB of data stored in the storage node 104 SC1 is going to expire in 5 days, then that value of capacity may be added to the value of the cell in column 416 and row 418 in FIG. 4 (not shown in FIG. 4). For example, the value may be computed as 100 TB+10 TB=110 TB. Then, the percentage values in the capacity usage data structure 208 may be updated based on the change(s) following the inclusion of any capacity added due to deletion of expired data.

Furthermore, if data that will expire soon is identified in an unbalanced storage node (e.g., lower available capacity), then this data may be excluded from any data to be moved, as it is inefficient to move data that will be deleted due to expiration soon after movement of the data from a first storage node 104 to a second storage node 104. Accordingly, tracking data with expiration times can increase the accuracy deciding which storage nodes are unbalanced and may increase the efficiency of the data movement and the data placement policy by taking into account the data lifecycle and expiration time.

At 910, the computing device may determine whether all storage nodes 104 in the system 100 have been subject to analysis for adding information to the capacity usage data structure 208. For example, the computing device may iterate through all the storage nodes 104 listed in the capacity usage data structure 208. After all storage nodes 104 have been processed and analyzed, the process 900 may proceed to block 706 of FIG. 7 for performing the process 700. Otherwise, if more storage nodes 104 are to be analyzed, the process may return to 902 to select a next storage node 104 for analysis.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Additionally, while several example systems have been described, numerous other systems able to implement the storage and capacity-usage-balancing techniques herein will be apparent to those of skill in the art having the benefit of the disclosure herein.

Various instructions, processes, and techniques described herein may be considered in the general context of computer-executable instructions, such as programs stored on computer-readable media, and executed by the processor(s) herein. Generally, programs include routines, modules, applications, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   a service node able to communicate with a plurality of storage nodes, the service node storing metadata corresponding to data stored by the storage nodes, the service node including one or more processors configured by executable instructions to perform operations comprising:
   determining an available capacity for respective ones of the storage nodes;
   determining an estimated available capacity of the respective storage nodes at a future point in time based at least in part on the available capacity, a data placement policy, and an estimated data ingest throughput;

comparing the estimated available capacity of a first one of the storage nodes at the future point in time with the estimated available capacity of a second one of the storage nodes at the future point in time;

based at least in part on determining that a difference between the estimated available capacity of the first storage node at the future point in time and the estimated available capacity of the second storage node at the future point in time exceeds a threshold difference, determining an amount of data to move from the first storage node; and moving the amount of data from the first storage node over time to cause a difference between the available capacity of the first storage node and the available capacity of the second storage node to be reduced toward the threshold difference.

2. The system as recited in claim 1, wherein:

the data placement policy includes a weighting for storing different amounts of received data at different ones of the storage nodes; and the estimated ingest throughput is based at least in part on an amount of data received from user devices over at least one past time period.

3. The system as recited in claim 1, wherein the future point in time is based at least in part on a time threshold specified for reducing the difference to or below the threshold difference.

4. The system as recited in claim 1, wherein the operation of determining the amount of data to move from the first storage node comprises determining an amount of data to move to reduce the difference between the available capacity of the first storage node and the available capacity of the second storage node to be equal to or less than the threshold difference by the future point in time.

5. The system as recited in claim 1, wherein the second storage node is a storage node having a highest amount of available storage capacity with respect to a total storage capacity of the storage node.

6. The system as recited in claim 1, wherein the operation of determining the estimated available capacity of the respective storage nodes at the future point in time comprises, for an individual one of the storage nodes:

determining a portion of received data to be allocated to the individual storage node based on the data placement policy;

determining an estimated data amount of data to be received over an upcoming time period up to the future point in time based on the estimated ingest throughput; and determining the estimated available capacity for the individual storage node at the future point in time based on reducing the available capacity of the individual storage node by a value determined based on the portion of received data to be allocated to the individual storage node and the estimated data amount to be received over the upcoming time period.

7. The system as recited in claim 1, wherein the operation of determining the estimated available capacity of the respective storage nodes at the future point in time further comprises, for an individual one of the storage nodes:

determining data that is set to be deleted by the future point in time on the individual storage node; and adding to the estimated available capacity of the individual storage node the amount of data stored on the individual storage node that is set to be deleted by the future point in time.

8. A method comprising:

determining, by one or more processors, an estimated available capacity at a future time for respective storage nodes of a plurality of storage nodes;

comparing the estimated available capacity of a first one of the storage nodes at the future time with the estimated available capacity of a second one of the storage nodes at the future time;

based at least in part on determining that a difference between the estimated available capacity of the first storage node at the future time and the estimated available capacity of the second storage node at the future time exceeds a threshold difference, determining an amount of data to move from the first storage node; and moving data from the first storage node to cause the difference between an available capacity of the first storage node and an available capacity of the second storage node to be reduced.

9. The method as recited in claim 8, further comprising determining the estimated available capacity of the respective storage nodes at the future time based at least in part on a data placement policy and an estimated ingest throughput.

10. The method as recited in claim 9, wherein the data placement policy includes a weighting for storing different amounts of received data at different ones of the storage nodes.

11. The method as recited in claim 9, wherein the estimated ingest throughput is based at least in part on an amount of data received from user devices over at least one past time period.

12. The method as recited in claim 8, wherein the second storage node is a storage node of the plurality of storage nodes having a highest amount of available storage capacity with respect to a total storage capacity of the second storage node.

13. The method as recited in claim 8, wherein determining the amount of data to move from the first storage node comprises determining an amount of data to move to reduce the difference between an available capacity of the first storage node and an available capacity of the second storage node to be equal to or less than the threshold difference by the future point in time.

14. The method as recited in claim 8, wherein determining the estimated available capacity at the future time of the respective storage nodes further comprises, for an individual one of the storage nodes:

determining data that is set to be deleted by the future time on the individual storage node; and adding to the estimated available capacity of the individual storage node the amount of data stored on the individual storage node that is set to be deleted by the future time.

15. One or more non-transitory computer-readable media storing instructions that, when executed by one or more processors of a computing device, configure the one or more processors to perform operations comprising:

determining an estimated available capacity at a future time for respective storage nodes of a plurality of storage nodes;

comparing the estimated available capacity of a first one of the storage nodes at the future time with the estimated available capacity of a second one of the storage nodes at the future time;

based at least in part on determining that a difference between the estimated available capacity of the first storage node at the future time and the estimated available capacity of the second storage node at the future time exceeds a threshold difference, determining an amount of data to move from the first storage node; and moving data from the first storage node to cause the difference between an available capacity of the first storage node and an available capacity of the second storage node to be reduced.

16. The one or more non-transitory computer-readable media as recited in claim 15, the operations further comprising determining the estimated available capacity of the respective storage nodes at the future time based at least in part on a data placement policy and an estimated ingest throughput.

17. The one or more non-transitory computer-readable media as recited in claim 16, wherein:

the data placement policy includes a weighting for storing different amounts of received data at different ones of the storage nodes; and the estimated ingest throughput is based at least in part on an amount of data received from user devices over at least one past time period.

18. The one or more non-transitory computer-readable media as recited in claim 15, wherein the second storage node is a storage node of the plurality of storage nodes having a highest amount of available storage capacity with respect to a total storage capacity of the second storage node.

19. The one or more non-transitory computer-readable media as recited in claim 15, the operation of determining the amount of data to move from the first storage node comprises determining an amount of data to move to reduce the difference between an available capacity of the first storage node and an available capacity of the second storage node to be equal to or less than the threshold difference by the future time.

20. The one or more non-transitory computer-readable media as recited in claim 15, wherein the operation of determining the estimated available capacity at the future time of the respective storage nodes further comprises, for an individual one of the storage nodes:

determining data that is set to be deleted by the future time on the individual storage node; and adding to the estimated available capacity of the individual storage node the amount of data stored on the individual storage node that is set to be deleted by the future time.

\* \* \* \* \*